United States Patent Office 3,026,283
Patented Mar. 20, 1962

3,026,283
DECOLORIZING SYNTHETIC RESINS
John Conrad Schlegel, Jr., and Charles Hosea Dugliss, Yorktown Heights, N.Y., assignors to American Cyanamid Company, New York, N.Y., a corporation of Maine
No Drawing. Filed Mar. 24, 1958, Ser. No. 723,107
9 Claims. (Cl. 260—40)

This invention relates to a method for masking the inherent yellow coloration associated with resinous materials and particularly concerns the production of clear plastic products prepared from a styrene or a polyester resin composition wherein the yellow color of the polymerized product is eliminated visually by the incorporation into said plastics a color combination consisting of ultramarine blue pigment and an oil-soluble violet dye. This invention further relates to the products produced by this process.

It is an object of this invention to prepare apparently water-white plastic compositions.

A further object of this invention is to eliminate visually the inherent yellow coloration associated with resinous materials derived from certain types of polymerizable compositions.

Another object of this invention is to prepare apparently water-white plastic materials from a styrene or mixtures of an ethylenically unsaturated monomeric material and a polymerizable unsaturated linear polyester.

These and other objects of this invention will be apparent to those skilled in the art, especially upon consideration of the discussion presented hereinbelow.

Polyester resin compositions, that is those copolymerizable mixtures comprising an ethylenically unsaturated polymerizable monomeric material and a polymerizable unsaturated polyester resin, are extensively used to produce various types of plastic products. These polyester resin compositions are used in such fields as laminating, adhesives, surface coatings and in the preparation of filled or unfilled castings. This invention is especially concerned with the use of polyester resin compositions in the preparation of clear unfilled castings and translucent, glass-fiber reinforced laminates. Practical commercial application of these particular types of plastic fabrications is exemplified in those manufactures directed to the production of buttons, covers for various toiletry items, lenses for clocks, instruments, etc., containers for packaging a variety of household items, corrugated structural panels, and the like. A polystyrene derived from any one of a number of particular types of styrene are also used to prepare many of the types of items listed among other analogous types. A desirable common property of the various plastic fabrications mentioned is that they be water-white as observed by the human eye. It is generally very difficult to secure water-white plastic fabrications of this type. The polyester resin compositions due to the unsaturated linear polyester resin invariably possess a definitely perceptible degree of yellowness. Regardless of the care taken in the selection of the raw material used to prepare the unsaturated linear polyester and also in spite of the precautions that may be exercised in preparing these resinous compositions, it is not known how to obviate this seemingly inherent yellow color almost invariably developed. Ordinarily, when these polyester resin compositions are cured, that is in the polymerization procedure required to cross-link the monomeric material with the reactive resin component of the composition, the yellow coloration is increased somewhat. On the other hand, the styrene monomer employed to prepare a polystyrene is generally water-white in its monomeric state, but a degree of yellow coloration is developed during the polymerization step. The degree of yellow coloration developed in this latter type of polymerization process depends to some extent upon the type of catalyst used, the amount of same and various other considerations known to those skilled in the art. Polystyrenes rarely possess as dark a color as cured polyester resin compositions; nevertheless, it can be stated generally, that in any efficient polymerization process concerning the polymerization of a styrene, a certain amount of objectionable discoloration or yellowing will occur.

We have found an effective way of masking the discoloration or yellowness which normally exists in polymerized products derived from polyester resin compositions or a styrene. We have found that if a small amount of a color combination of a blue pigment and an oil-soluble violet dye is homogeneously dispersed in these plastic products, they will possess no yellow coloration. Actually, the practice of this invention does not dissipate or obviate the inherent color propensities encountered in polymerized compositions of this type. The use of the color combination in accordance with this invention merely changes any yellow color that may develop, or exist, to a gray coloration. If, for instance, the polyester resin composition does not possess abnormally dark degrees of yellowing, these degrees can be converted to a corresponding gray coloration which is unnoticed by the human eye. Similarly, in the case of the preparation of polystyrene, if the yellowness that would ordinarily develop without the use of a masking color be not abnormal, the observance of any perceptible coloration can be precluded by the use of the color combination in accordance with this invention.

The color combination which we have found to be particularly useful in the masking of the yellow coloration of various plastics is a combination of ultramarine blue pigment and an organic violet dye. The theory upon which our color combination works is that the blue pigment serves to convert the yellow coloration of the resin to a green coloration. The violet dye being essentially red in nature, complements the green coloration produced, to ultimately yield a grayish coloration which ordinarily is unobservable to the human eye, particularly in rather thin fabrications of the plastic as exemplified in many of the use applications indicated hereinabove.

Since monomeric styrene is a colorless material, one must first polymerize a sample of the monomer employing the desired conditions of polymerization and then determine the degree of yellow coloration of the polymerized samples. Thereafter, the styrene monomer may be polymerized under the same conditions in the presence of an amount of color combination which will effectively mask the amount of yellowness that would have developed without the use of a masking agent. This technique, as it relates to the masking of color developed in polymerizing a styrene, will be shown in detail in the specific embodiments set forth hereinbelow.

While it is conceivable that a number of other blue and red colorants would serve to mask the yellow color of resinous compositions in the manner in which our combination performs, our particular combination of colorants is especially unique because each component is stable to oxidation, heat and ultraviolet light. No other combination is known which is as stable to these influences as the particular combination of this invention.

Ultramarine blue is a pigment consisting essentially of sodium and aluminum silicates with sodium polysulfides. It is commercially available and extensively used in the manufacture of ceramics, surface coatings and the like fields. It is generally marketed in a ground powder form, having a particle size in the order of 0.2 micron and may be added in this form to the polymerizable material. The blue pigment is not soluble in the resin; however, if it is incorporated into the resin properly, it will remain permanently suspended throughout the resinous medium. The other colorant used in our masking composition is an anthraquinone dye, specifically 1,5-diparatoluidinoanthraquinone. This material corresponds to the dye designated CI 1080, except that it contains no sulfonate groups. This modification of CI 1080 is an oil-soluble type dye and consequently is readily soluble in the resinous compositions of this invention.

The ratio of pigment to dye that may be employed depends primarily on the hue of the yellow color of the resinous material to be masked. However, the shades of yellowness encountered in the resinous compositions of this invention do not vary extensively. It has been found that if the amount of dye of our coloring compositions is maintained constant, then a variation of the ratio of pigment to dye will ordinarily compensate for the various hues of yellow encountered. For instance, if one part of the dye is employed in the coloring composition, the amount of pigment may be varied from about 20 parts to about 40 parts. The optimum ratio and consequently the preferred ratio for polyester resin compositions is 30/1 (pigment to dye, respectively).

The amount of our masking combination which may be employed varies over a rather narrow range. Usually from about 0.0002% to about 0.003% is adequate. There are several ways of determining the amount of the color masking combination which is to be used. The most convenient method is based upon the APHA color value of the composition which is to be masked. The APHA system is that devised by the American Public Health Association for determining the color of natural and treated waters which are not grossly polluted. This method has been adopted with considerable success in characterizing the color of a number of resinous and oleaginous materials. The unit of color of this system is that produced by one mg. of platinum (as potassium chloroplatinate) in combination with 2 mg. of cobaltous chloride $$(CoCl_2 \cdot 6H_2O)$$

per liter of distilled water. It has been determined that a plot of APHA color of resinous compositions versus the total percent of our color combination necessary to mask the yellow color corresponding to the APHA value is a straight line function. Accordingly, the amount of color combination to be used for a majority of the polyester resin compositions can be expressed as follows: total percent color=0.000154 × APHA color. In determining the APHA color of resinous compositions, the standard 100 ml. Nessler tubes may be used. However, this manner is rather cumbersome, particularly where it is desired to determine the APHA color of solid materials. Therefore, it is considerably more convenient to determine the APHA color by spectrographic determinations. Those skilled in the art of color determination can readily convert the spectrographic color readings obtained by standard testing devices into the corresponding APHA color value.

Our method of masking the yellow color of resinous compositions is only practical in those instances where the resinous composition has a APHA color of 150 or less. Resin compositions having a color value of greater than 150 can be masked, but as a result of such a procedure, a gray coloration is developed. While the shade of gray produced in this manner may not be as objectionable as the initial yellow color, nevertheless, these highly colored compositions cannot be made to appear water-white. Obviously, there is no lower limit of coloration which is not beneficially affected by our masking procedure.

The polyester resin compositions which may be masked in accordance with this invention are generically considered to be those resinous compositions which result from the conjoint polymerization of a reactive unsaturated linear resin, usually obtained by condensing an alpha, beta ethylenically unsaturated dicarboxylic acid and a polyol, generally a glycol, and an ethylenically unsaturated polymerizable monomeric compound.

The reactive unsaturated resins of these compositions may be prepared by esterifying an alpha, beta unsaturated polycarboxylic acid with a polyhydric alcohol, usually a saturated aliphatic glycol. Among the alpha, beta ethylenically unsaturated polycarboxylic acids that may be used are such as maleic, fumaric, aconitic, itaconic, monochloromaleic anhydride, and the like. Non-polymerizable dicarboxylic acids may also be employed if used in combination with an ethylenically unsaturated carboxylic acid. If a non-polymerizable acid is used, the amount should not constitute more than 80% of the total equivalence of carboxyl groups present in the esterifying mixture. Examples of non-polymerizable polycarboxylic acids which may be used in the manner described include: oxalic, malonic, succinic, glutaric, sebacic, adipic, pimelic, suberic, azelaic, tricarballylic, citric, tartaric and malic phthalic isophthalic, terephthalic, the various chlorinated phthalic acids and hexachloroendomethylene tetrahydrophthalic, and the like. Whenever available, the anhydrides of these acids may be substituted therefore in full or in part.

Among the glycols that may be employed to prepare the polymerizable unsaturated polyester resins are ethylene glycol, diethylene glycol, propylene glycol, dipropylene glycol, triethylene glycol, tetraethylene glycol, butanediol-1,2, butanediol-1,3, butanediol-1,4, pentanediol-1,2, pentanediol-1,4, pentanediol-1,5, hexanediol-1,6, neopentyl glycol, and the like. Polyhydric alcohols having more than two hydroxyl groups which may be used are such as: glycerol, trimethylol ethane, trimethylol propane, pentaerythritol, dipentaerythritol, sorbitol, mannitol, adonitol, dulcitol, arabitol, xylitol, etc. It is usually desirable that dihydric alcohol be employed in major proportion relative to any alcohols containing more than two hydroxyl groups which may be used in forming the unsaturated polyester resin.

In the preparation of the reactive unsaturated polyesters, it is usually desirable that a polyhydric alcohol and preferably a dihydric alcohol be employed in an amount which represents at least a theoretical or equivalent of the hydroxyl groups to that represented by the acids used. However, it is preferred that an excess of polyhydric alcohol approximating 10 or 15% above the stoichiometric quantity required for a substantially complete esterification of the acid or acids be employed. When a polyhydric alcohol containing more than two hydroxy groups and/or a polycarboxylic acid having more than two carboxyl groups are used, it is generally desirable to increase the amount of excess of hydroxyl groups to about 15% to 20% in order that there will be substantial esterification of the acids present without the occurrence of any appreciable amount of crosslinking.

The polyhydric alcohol and the polycarboxylic acid or the various mixtures of each that may be employed should be reacted sufficiently to produce an ultimate polyester resinous material having an acid number preferably not greater than 55. A suitable acid number range for resins of this type is from about 35 to about 40. It is generally preferred that the acid number should be as low as possible, but this is sometimes altered or controlled by practical considerations of operations such as time and temperature and economy. The determination of acid number is a means for determining the amount of condensation or esterification that has occurred. This control means comprises ascertaining the milligrams of potassium hydroxide required to neutralize one gram of the resinous condensate.

The temperature at which the polycarboxylic acid and the polyhydric alcohol are reacted is not critical. When the esterification is carried out at atmospheric pressure, the optimum temperature is usually just below the boiling point of the most volatile component of the reaction mixture which is generally the glycol employed. Temperatures in excess of the boiling point of the lowest boiling glycol constituent may be used if care is taken to provide the reaction vessel with a reflux condenser. Such a device permits the water of esterification to escape from the reaction mixture while volatilized glycols will be condensed therein and returned to the reaction mixture.

It is not known how to preclude entirely the development of an amber or yellow color in the preparation of these unsaturated polyester compositions. However, in order to minimize the amount of coloration that occurs, it is necessary that the esterification reaction be conducted in an inert atmosphere obtained by bubbling a gas such as carbon dioxide or nitrogen through the esterifying mixture and maintaining a blanket of said inert gas over the reactants. Further details pertaining to the preparation of these unsaturated polyester resins are disclosed in Ellis Patent No. 2,255,313 and Kropa Patents Nos. 2,443,735 to 2,443,741, inclusive, which are incorporated herein by reference.

The cross-linking agent for the unsaturated polyester is any one of a number of polymerizable monomeric materials having a $CH_2=C<$ group and desirably having a boiling point in excess of 60° C. Suitable among these polymerizable compounds are styrene, side chain substituted alkyl styrenes such as alpha methyl styrene, alpha ethyl styrene, and the like; or ring-substituted styrenes, such as ortho, meta, and para alkyl styrenes including o-methyl styrene, m-methyl styrene, p-methyl styrene, p-ethyl styrene, m-propyl styrene, 2,4-dimethyl styrene, 2,5-diethyl styrene, and the like. Alkyl esters of acrylic and methacrylic acids may be used as the cross-linking material. Also, aliphatic vinyl esters may be used including vinyl acetate, vinyl butyrate, vinyl laurate, vinyl stearate, acrylonitrile, methacrylonitrile, etc. Acrylamide and methacrylamide may likewise be used. Still further, the various allyl esters may be advantageously employed. Examples of the diallyl esters which find use in this manner are such as diallyl phthalate, diallyl succinate, diallyl maleate, diallyl fumarate, diallyl adipate, diallyl sebacate, diallyl mesaconate, diallyl itaconate, the diallyl esters of various chlorophthalic acids, the diallyl ester of endomethylenetetrahydrophthalic anhydride, and the like. Triallyl esters may also be used, e.g., triallyl tricarballylate and triallyl trimesate, triallyl cyanurate, triallyl isocyanurate, triallyl monochlorosilane, etc. Furthermore, monoallyl esters such as allyl methacrylate, allyl acrylate, etc., may be used. These polymerizable materials containing the $CH_2=C<$ group may be used singly or in combination with one another.

The ratio of the unsaturated polyester resin to the monomeric cross-linking agent may be varied over a wide range. The unsaturated resin content may, therefore, range from about 10 to about 90 parts to a corresponding 90 to 10 parts of polymerizable monomer. For the majority of the purposes, however, the active polymerizable components comprise from about 40 to about 60 parts by weight of the unsaturated resin and correspondingly from about 60 to 40 parts of the polymerizable monomeric material.

The thermoplastic resinous compositions whose color may be effectively masked in accordance with our invention include both copolymers and homopolymers of compounds represented by the general formula:

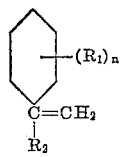

wherein $R_1$ is a lower alkyl radical having one to four carbon atoms, or a halogen and $n$ is an integer of from 0 to 2 and $R_2$ is a member selected from the group consisting of hydrogen, a halogen and lower alkyl radicals. Examples of such compounds are styrene per se, nuclear-substituted alkyl styrenes, e.g., o-, m-, and p- methyl styrenes, 2,3- and 2,5-dimethyl styrene, p-ethyl styrene, m-propyl styrene and the like; nuclear-substituted haloalkyl styrenes, e.g., p-chloromethyl styrene, m-dibromoethyl styrene and the like; nuclear-substituted halo styrenes, e.g., o-, m- and p-chlorostyrenes, o-, m- and p-bromostyrenes, 2,3-, 3,4- and 2,4-dichlorostyrene, 2-iodo, 3-methyl styrene and the like; alpha-substituted styrenes, e.g., alpha-methyl styrene, alpha-ethyl styrene, alpha-chloro styrene, alpha-bromo styrene, alpha-iodo styrene and the like. Mixtures of these styrene compounds may be employed if desired. Other monomers may be used in combination with the styrenes mentioned hereinabove to produce the thermoplastic resinous compositions of this invention. These monomers include such as acrylonitrile; the various substituted acrylonitriles (e.g., methacrylonitrile, ethacrylonitrile, phenylacrylonitrile, etc.); the various acrylamides and substituted acrylamides (e.g., methacrylamide, ethacrylamide); the various N-substituted acrylamides; vinyl esters, e.g., vinyl acetate, vinyl butyrate, vinyl acrylate, etc.; esters of acrylic acid and the various alpha-substituted acrylic acids, etc., and butadiene.

In order to facilitate the polymerization of the vinyl compounds stated hereinabove or in the case of the polymerization of the polyester resin composition referred to hereinabove, it is preferred that the polymerization mechanism be accelerated by incorporating a catalyst into the polymerizable composition. Among such catalysts are the inorganic peroxides and various organic peroxy catalysts, none of which needs to be specifically recited as they are well known in the art.

The various modes for effecting polymerization of the thermoplastic compositions or the polyresin compositions which are contemplated in our invention are well known to those skilled in the art and need not be discussed in detail here.

In order that those skilled in the art may better understand how the present invention may be practiced, the following examples are given. These examples are set forth primarily for the purpose of illustration and any specific enumeration of details contained therein should not be interpreted as a limitation on the case except as indicated in the appended claims. All parts specified are parts by weight unless otherwise indicated.

*Example 1*

Into a suitable reaction vessel equipped with a stirrer, thermometer and an air-cooled reflux condenser were charged 96 parts of maleic anhydride, 296 parts of phthalic anhydride and 250 parts of propylene glycol. With carbon dioxide passing through the reaction mixture, the mixture was heated gradually to a temperature of 160° C. Heating was continued at this temperature for approximately three hours, whereupon the reaction temperature was gradually raised to 195° C. Heating was continued until an acid number of 40 was obtained. The resinous reaction product was then rapidly cooled to about 70° C. and discharged into an open vessel. To the yield of resin solids were added 38 parts of styrene per 62 parts of the unsaturated polyester resin. The APHA of the resultant resinous composition was 30. To the resinous polyester composition was added 0.00055% of a color combination consisting of ultramarine blue pigment and 1,5-diparatoluidinoanthraquinone in the ratio of 30:1, respectively.

One-eighth inch castings were prepared by polymerizing the above resinous composition in a glass cell mold. The resinous composition prior to curing was catalyzed with 1% Luperco ATC (50% benzoyl peroxide—50% tricresyl phosphate). The castings were cured by heating at 125–250° F. over a 17-hour cycle. Upon completion of curing, the castings showed no visible yellow coloration but were water-white in appearance.

The color combination was added to the resinous composition in this instance in the form of dry powder.

This method of incorporating the tinting agent is not particularly desirable because of the length of time required to uniformly incorporate the pigment throughout the resinous material and to effect solution of the dye component. A more desirable way of incorporating the tinting agent consists of preparing a dispersion of the pigment in the polyester resin. This may be conveniently done by ball milling the mixture. A concentrated dye solution can be prepared by dissolving the dye in any one of a number of hydrocarbon solvents on the monomeric cross-linking agent used. The pigment dispersion and the dye solution may then be combined giving a master color batch having the desired ratio of colorants or they may each be added to the polyester resin composition in requisite amounts.

*Example 2*

An unsaturated polyester resin corresponding to that of Example 1 was processed in an identical manner as employed in said example, except that the resinous condensation product was held until it possessed an acid number 20. The increased time of holding at elevated temperature in order to obtain the low acid number resulted in the product which when mixed with styrene in the ratio of 62:38, respectively, had a APHA color of 65. To this resinous composition was added 0.001024% of the combination consisting of ultramarine blue pigment and 1,5-diparatoluidinoanthraquinone in the weight ratio of 25:1, respectively. Castings of this tinted composition were prepared in the manner employed in preparing the castings of Example 1. The cured resin strips appeared colorless when viewed perpendicularly to their plane axes.

*Example 3*

Into a suitable reaction vessel equipped as in Example 1 were charged 96 parts of maleic anhydride, 148 parts of phthalic anhydride and 233 parts of diethylene glycol. This mixture was heated with stirring and nitrogen gas passing beneath the surface of the mixture to a temperature of 180° C. Heating was continued at this temperature for four hours. The temperature of the reaction mixture was then raised to 210° C. and held at this temperature until an acid number of 35 was obtained. The unsaturated resin was then cooled to 60° C. and a quantity of diallyl phthalate was added in order to yield a composition having a resin to monomer ratio of 70:30, respectively. The APHA color value of this resinous composition was determined to be 55. An ultraviolet absorber consisting of 2-hydroxy-4-methoxybenzophenone in the amount of 0.25% based on the resinous composition was then added and dissolved in the resinous composition with stirring. Next, a color combination consisting of ultramarine blue pigment and 1,5-diparatoluidinoanthraquinone in the ratio of 30:1, respectively, was added in the amount of 0.001485% based on the weight of resin solids. Of this amount of tinting agent, 58% was required for the resinous composition and 42% of the combination was required to mask the color contributed to the composition by the dissolved ultraviolet absorber. The amount of tinting agent required for the ultraviolet absorber was determined by preparing a 0.25% solution of the light stabilizer in a styrene solution, and determining the amount of tinting agent required to neutralize or mask the resultant color value by titrating with a known concentration of the color combination. The APHA color of the resin composition was determined independently by means of a spectrographic recorder. This method was necessitated because if the color value is noted for the absorber-polyester solution per se by the spectrographic procedure, a true APHA color value cannot be readily determined. Alternately, of course, the color value of the absorber and resinous composition combination can be determined by the standard method employing Nessler tubes.

The tinted resinous composition containing the ultraviolet light absorber was catalyzed with 1% Luperco ATC. The catalyzed resin was then poured between two Herculite glass plates separated by 1/8" thick rubber gasket material. The resin was cured by heating in a forced draft oven for 16 hours at 200° F. The resultant cured product when visually observed perpendicularly to the plane axis of the molded sheet appeared water-white in color.

*Example 4*

Into a suitable reaction vessel equipped as in Example 1 were charged 192 parts maleic anhydride, 285 parts of tetrachlorophthalic anhydride and 205 parts of ethylene glycol. With carbon dioxide gas passing through the reaction mixture, the esterifying components were heated gradually with stirring to a temperature of 170° C. This temperature was maintained for 5 hours and then the temperature gradually raised to 190° C. Heating was then continued until an acid number of 35 was obtained. The resin was then cooled to 50° C., whereupon an amount of triallyl cyanurate equal to the weight of the resin yield was added and a homogeneous solution of this combination was accomplished by stirring. The APHA color value of this polyester resin composition was determined to be 90. To this mixture was added a combination of ultramarine blue pigment and the dye of Example 3 in the ratio of 40:1, respectively. The amount of the masking agent required was 0.0015% based on the polyester resin composition. This decolorized composition was then catalyzed with 1% Luperco ATC and a 1/8" casting was prepared from the catalyzed resin in the manner employed in Example 1. The cured casting contained no yellow coloration although there was a slight perceptible shade of gray coloration noted.

*Example 5*

A styrene-acrylonitrile copolymer in the weight ratio of 70:30, respectively, was polymerized in the manner described in Melchore U.S. Patent No. 2,745,824. In essence, this method consisted of charging the necessary quantities of monomers to a prebodying pot and adding thereto benzoyl peroxide as the polymerization catalyst in the amount of 1% based on the charge weight of monomer. The polymerizable mixture was heated to 90° C. and with stirring was held at this temperature for 9 hours after which time the polymerization mixture contained about 60% polymer and 40% residual monomer. The viscosity of this partially polymerized charge was approximately 300 centipoises when measured at 125° C. The partially polymerized charge was thereupon discharged from the prebodying pot into a devolatilization extruder of the type described in said patent. The temperature of the charge introduced into the extruder instantly rose to 170° C. and was maintained at this temperature during this phase of the polymerization cycle. The devolatilization pressure within the extruder was maintained at 20 mm. Hg and the residence time in the extruder was 2 minutes. The polymerized product from the extruder contained 98% polymeric material. The extruded material was fabricated by means of a differential roll into a sheet having a 1/8" thickness. An APHA color of 20 was noted for the fabricated sheet.

A copolymer of styrene-acrylonitrile in the weight ratio of 70:30, respectively, was made in an identical manner as that described directly hereinabove. However, when the charge in the prebodying pot had polymerized to an extent represented by 50% conversion, a quantity of ultramarine blue pigment in the amount of 0.00038% based on the weight of the charge and 0.0000132% of 1,5-diparatoluidinoanthraquinone were added to the material in the prebodying pot. This amount of color combination was calculated as that quantity required to mask the yellow color of a completed product having an APHA color of 20. A 1/8" thick casting was prepared from this material in the manner employed in preparing the casting of the unmasked casting. A visual inspection of the two castings showed that the casting prepared from the material containing coloring agents was water-white in appearance whereas the casting containing no masking agent possessed a slight degree of yellow coloration.

The use of the special color masking pigment-dye combination of the present invention has the advantage over other masking materials inasmuch as it is stable against oxidation; does not tend to lose color; is stable against ultraviolet light, and in the unsaturated polyester resin compositions, is stable against decomposition at the temperatures of cure.

With respect to ultraviolet light absorption, any one of a plurality of ultraviolet absorbers may be utilized in either the thermoplastic polystyrene compositions or the potentially thermosetting unsaturated polyester resin compositions by incorporating therein conventional amounts of ultraviolet absorbers such as those disclosed in the U.S. Patent 2,777,828.

We claim:

1. A process for masking the inherent yellow coloration of a polymerization product of an unsaturated material selected from the group consisting of (1) a styrene and (2) a mixture of an unsaturated, substantially linear polyester resin prepared by reacting an alpha, beta-ethylenically unsaturated dicarboxylic acid and an aliphatic diol and a monomeric cross-linking agent containing a $CH_2=C<$ group and having a boiling point in excess of 60° C. which comprises copolymerizing said material in the presence of from about 0.0002% to 0.003% of a combination of ultramarine blue pigment and 1,5-diparatoluidinoanthraquinone, said pigment and said anthraquinone having a weight ratio of from about 20:1 to 40:1, respectively.

2. A process for masking the inherent yellow coloration of the polymerization product of a styrene which comprises polymerizing said styrene in the presence of from about 0.0002% to 0.003% of a combination of ultramarine blue pigment and 1,5-diparatoluidinoanthraquinone, said pigment and said anthraquinone having a weight ratio of from about 20:1 to 40:1, respectively.

3. A process for masking the inherent yellow coloration of the polymerization product of a mixture of an unsaturated substantially linear polyester resin prepared by reacting an alpha, beta-ethylenically unsaturated dicarboxylic acid and an aliphatic diol and a monomeric cross-linking agent containing a $CH_2=C<$ group and having a boiling point in excess of about 60° C. which comprises polymerizing said mixture in the presence of from about 0.0002% to 0.003% of a combination of ultramarine blue pigment and 1,5-diparatoluidinoanthraquinone, said pigment and said anthraquinone having a weight ratio of from about 20:1 to 40:1, respectively.

4. A process for masking the inherent yellow coloration of the polymerization product of styrene which comprises polymerizing said styrene in the presence of from about 0.0002% to 0.003% of a combination of ultramarine blue pigment and 1,5-diparatoluidinoanthraquinone, said pigment and said anthraquinone having a weight ratio of from about 20:1 to 40:1, respectively.

5. A process for masking the inherent yellow coloration of the polymerization product of methyl styrene which comprises polymerizing said methyl styrene in the presence of from about 0.0002% to 0.003% of a combination of ultramarine blue pigment and 1,5-diparatoluidinoanthraquinone, said pigment and said anthraquinone having a weight ratio of from about 20:1 to 40:1, respectively.

6. A process for masking the inherent yellow coloration of a polymerization product of a mixture of an unsaturated, substantially linear polyester resin prepared by reacting an alpha, beta unsaturated dicarboxylic acid and an aliphatic diol with styrene which comprises polymerizing said mixture in the presence of from about 0.0002% to 0.003% of a combination of ultramarine blue pigment and 1,5-diparatoluidinoanthraquinone, said pigment and said anthraquinone having a weight ratio of from about 20:1 to 40:1, respectively.

7. A polymerizable composition comprising (1) a member of the group consisting of (a) a polymerizable styrene and (b) a mixture of an unsaturated, substantially linear polyester resin, prepared by reacting an alpha, beta-ethylenically unsaturated dicarboxylic acid and an aliphatic diol, and a monomeric cross-linking agent containing a $CH_2=C<$ group and having a boiling point in excess of 60° C., in admixture with (2) from about 0.0002% to 0.003% of a combination of ultramarine blue pigment and 1,5-diparatoluidinoanthraquinone, said pigment and said anthraquinone having a weight ratio of from about 20:1 to 40:1, respectively.

8. A polymerizable composition comprising a polymerizable styrene in admixture with from about 0.0002% to 0.003% of a combination of ultramarine blue pigment and 1,5-diparatoluidinoanthraquinone, said pigment and said anthraquinone having a weight ratio of from about 20:1 to 40:1, respectively.

9. A polymerizable composition comprising a mixture of an unsaturated, substantially linear polyester resin, prepared by reacting an alpha, beta-ethylenically unsaturated dicarboxylic acid and an aliphatic diol, and a monomeric cross-linking agent containing a $CH_2=C<$ group and having a boiling point in excess of 60° C., in admixture with from about 0.0002% to 0.003% of a combination of ultramarine blue pigment and 1,5-diparatoluidinoanthraquinone, said pigment and said anthraquinone having a weight ratio of from about 20:1 to 40:1, respectively.

References Cited in the file of this patent
UNITED STATES PATENTS

| | | |
|---|---|---|
| 2,191,947 | Allen et al. | Feb. 27, 1940 |
| 2,424,778 | Tainsh | July 29, 1947 |
| 2,719,090 | Morehead | Sept. 27, 1955 |
| 2,950,207 | Jones | Aug. 23, 1960 |